United States Patent [19]

Deschamps et al.

[11] 3,928,548

[45] Dec. 23, 1975

[54] PROCESS FOR PURIFYING A SULFUROUS ANHYDRIDE CONTAINING GAS AND PRODUCING ELEMENTAL SULFUR

[75] Inventors: André Deschamps, Chatou; Philippe Renault, Noisy-le-Roi; Claude Dezael, Maisons-Laffitte, all of France

[73] Assignee: Institut Francais du Petrole, des Carburants et Lubrifiants, Paris, France

[22] Filed: Sept. 17, 1973

[21] Appl. No.: 397,971

[30] Foreign Application Priority Data

Sept. 22, 1972  France .............................. 72.33814
Jan. 11, 1973   France .............................. 73.00975

[52] U.S. Cl. .............................. 423/575; 423/222
[51] Int. Cl.² .......................................... C01B 17/04
[58] Field of Search .................... 423/222, 243, 575

[56] References Cited

UNITED STATES PATENTS

| | | | |
|---|---|---|---|
| 2,031,802 | 2/1936 | Tyrer | 423/243 |
| 2,729,543 | 1/1956 | Keller | 423/575 |
| 2,881,047 | 4/1959 | Townsend | 423/575 X |
| 3,023,088 | 2/1962 | Urban | 423/575 |
| 3,103,411 | 9/1963 | Fuchs | 423/222 |
| 3,516,793 | 6/1970 | Renault | 423/573 |
| 3,598,529 | 8/1971 | Deschamps et al. | 423/575 |
| 3,798,309 | 3/1974 | Knowles | 423/243 X |

FOREIGN PATENTS OR APPLICATIONS

| | | | |
|---|---|---|---|
| 2,108,282 | 8/1972 | Germany | 423/575 |
| 1,910,127 | 9/1969 | Germany | 423/575 |
| 1,213,058 | 11/1970 | France | 423/575 |

Primary Examiner—G. O. Peters
Attorney, Agent, or Firm—Millen, Raptes & White

[57] ABSTRACT

Process for simultaneously purifying a sulfurous anhydride and oxygen containing gas and recovering produced sulfur comprising a first stage of absorbing the $SO_2$ of said gas in a solution of urea, thiourea or alkali metal or ammonium salt of a carboxylic acid or of an alkyl-, cycloalkyl- or aryl-phosphoric acid in an inert solvent and a second stage of producing sulfur and regenerating said solution by contacting it with a $H_2S$ containing gas.

7 Claims, No Drawings

PROCESS FOR PURIFYING A SULFUROUS ANHYDRIDE CONTAINING GAS AND PRODUCING ELEMENTAL SULFUR

The French Pat. Nos. 1,592,092 and 1,582,762 and the U.S. Pat. No. 3,598,529, have already described a process for removing the sulfurous anhydride contained as impurity in gases by converting the same to sulfur by means of hydrogen sulfide according to the following reaction :

$$2 H_2S + SO_2 \leftrightarrows 3 S + 2 H_2O$$

This process is noteworthy in that the conversion reaction is carried out at a temperature of, for example, from 20° to 160°C within a liquid reaction medium containing an alkali or alkaline earth metal salt of a carboxylic organic acid or of an alkyl phosphoric acid. The process, such as described in the above-mentioned patents, can be used for purifying gases containing both $H_2S$ and $SO_2$, in a molar ratio close to 2 : 1. In the case of a gas containing $H_2S$ or $SO_2$, separately or in respective amounts different from the stoechiometry of the reaction, it is necessary to provide for the supply of a complementary amount of gaseous $SO_2$ or $H_2S$, in order to obtain the required molar ratio $H_2S/SO_2$.

This operating technique is no longer possible when the gas to be purified contains oxygen in a noticeable amount, for example at a concentration of from 0.5 % up to 10 % by volume. As a matter of fact the simultaneous presence of $H_2S$, $SO_2$ and $O_2$ results in the formation of sulfur oxygenated acids with a corresponding decrease of the sulfur production. Accordingly, it is difficult to make use of the above-described process for treating $SO_2$ containing gaseous effluents issued from plants for the combustion, incineration or roasting of sulfur compounds in which air is generally used in excess: this relates to stack gases from power plants fed with fuel or coal, gas incinerators of sulfur plants, sulfuric acid plants or ovens for roasting ores.

It has now been discovered that it is possible to purify these effluents and to simultaneously produce elemental sulfur without the above-mentioned disadvantages by proceeding in two stages : in a first stage, the $SO_2$ is removed from the gas in which it is contained by $SO_2$ absorption : (a) in a solution of alkali metal or ammonium salt of a carboxylic organic acid or of an alkyl, cycloalkyl or aryl-phosphoric acid, (b) in a solution of urea or thiourea in an inert solvent and, in a second stage, the absorbing solution is contacted with a $H_2S$ containing gas, substantially in the absence of oxygen in order to be regenerated while simultaneously producing elemental sulfur.

The acid and the base which contribute to the formation of the salt may be used in proportions very different from the stoichiometrical one, i.e., either with an excess of free base or an excess of free acid. The ratio of the base equivalent to the acid equivalent may vary, for example, from 0.1 to 2, the selectivity being maximum for a ratio from 0.2 to 0.9.

In the case of partially salified polyacids, such for example as potassium acid phthalate, the ratio base/acid will be expressed by the ratio of the equivalents metal cations/$H^+$ cations.

When the process is carried out according to the invention, the reaction between $H_2S$ and $SO_2$ results essentially in the formation of sulfur, however, there are also formed small amounts of sulfur oxygenated acids which combine with the cation present in the solution. The presence of the so-formed salts is not an inconvenience and a makeup of the corresponding base may compensate for the cation consumption.

The acids which participate in the composition of the salts which can be used according to the invention, are those defined in the French Pat. Nos. 1,592,092 and 1,582,762.

More particularly there will be used the acyclic, alicyclic, aromatic and heterocyclic carboxylic mono and polyacids, as well as the alkyl-, cycloalkyl- or aryl-phosphoric acids having at least one acid function whose $pK_a$ is within the range of from 2.5 to 6 at 20°C.

Among the preferred salts which can be used according to the invention, there will be mentioned the sodium, potassium and ammonium salts of citric acid, adipic acid, benzoic acid, phthalic acid, salicylic acid, nicotinic acid, dibutylphosphoric acid and glycerophosphoric acid. It is however preferred to make use of the salts of benzoic acid due to their higher selectivity. These salts or optionally the corresponding acids and bases may be used in aqueous solution, in organic solvents or in mixtures of water with organic solvents. As a general rule the organic solvents to be used are all the liquids inert with respect to the gases containing $H_2S$ and/or $SO_2$. There will be mentioned in particular, for example, tetramethylenesulfone, ethyleneglycol, triethyleneglycol, polyethyleneglycol having an average molecular weight in the range of from 200 to 600, hexaethyleneglycol methyl ether as well as the heavy alcohols having from 12 to 20 carbon atoms per molecule.

When using urea or thiourea, there can be formed small amounts of sulfur oxygenated acids which are converted to ammonium salts as a result of a slow degradation of urea or of thiourea. The presence of these salts in the solution is not an inconvenience and the make-up of urea or thiourea for compensating said degradation, is very small.

Urea or thiourea may be used as aqueous solutions, in organic solvents or in mixtures of water with an organic solvent.

In most cases, the urea or thiourea content of the solution will be such that these compounds are entirely dissolved at the operating temperature. By way of example, concentrations in the range of 0.1 to 2 moles per liter and preferably from 0.2 to 1 mole per liter, may be used.

Each stage of the process may be carried out at a temperature from 20° to 130°C. The use of high temperatures in the first stage, however, reduces the absorbing capacity of the solution and requires the use of high solvent rates. According to a preferred embodiment of the process, the two stages are carried out at temperatures of the same order of magnitude, preferably within the range of from 40° to 90°C.

Under these conditions, sulfur is produced in the second stage in the solid state. It may be separated from the reaction medium for example by decantation or filtration or centrifugation followed by melting.

The first stage may be carried out in any convenient apparatus for contacting a gas and a liquid, for example a venturi, a packed column or a bubble column. The second stage is preferably carried out in an apparatus adapted for dispersing gas of high $H_2S$ content in the liquor to be regenerated. The process will be advantageously carried out by using a counter-current flow between the gas and the liquor in a series of cascade reactors.

In this process the $SO_2$ containing gas may be purified up to a very small $SO_2$ content, for example lower than 50 ppm by volume.

The following examples illustrate the invention, without however being limitative of the scope thereof.

EXAMPLE 1

A fume resulting from the incineration of a gaseous effluent from a Claus unit and having by volume the following composition:

| $SO_2$ | $H_2O$ | $O_2$ | $CO_2$ | $N_2$ |
|---|---|---|---|---|
| 1% | 30% | 2% | 5% | 62% | is injected at a rate of 1 m³/h into the bottom of a packed column at the upper portion of which we introduce, at a rate of 5 liters/h, a solution consisting essentially of a mixture of polyethyleneglycol having an average molecular weight of 400, water, sodium benzoate and benzoic acid. The solution contains about 500 g/l by volume of polyethyleneglycol 400, 0.4 mole/liter of sodium benzoate and 0.6 mole/liter of benzoic acid. The temperature is maintained at 75°C. The purified gas evolving from the column contains 80 ppm by volume of $SO_2$.

At the lower part of the column, we recover a liquid phase containing $SO_2$ in the form of sodium sulfites, said liquid phase being fed to the top of a second column filled with solution and also maintained at a temperature of 75°C. At the lower part of said second column, we inject, through a wall of fritted glass, hydrogen sulfide at a rate of 20 l/h. The $H_2S$ is almost entirely absorbed. From the bottom of the column, we recover a solution containing sulfur in suspension which, after filtration, is recycled to the first column. The sulfur cake, impregnated by the solution, is melted in an autoclave so as to separate pure sulfur from the solution which is recycled to the main circuit. The sulfur production amounts to 41 g per hour.

EXAMPLE 2

The test of example 1 is repeated on an amount of 1 m³/h of a fume issued from a fuel combustion plant and having the following composition by volume:

| $SO_2$ | $H_2O$ | $O_2$ | $CO_2$ | $N_2$ |
|---|---|---|---|---|
| 0.2% | 12% | 2% | 12% | 73.8% |

The solution of example 1 is circulated at a rate of 1.5 l/h; the two columns are operated at a temperature of 55°C.

The $SO_2$ content of the purified gas amounts to 50 ppm by volume and the sulfur production is 8.3 g/h.

EXAMPLE 3

The test of example 1 is repeated while circulating an aqueous solution containing 0.6 mole/liter of sodium dibutylphosphate and 0.3 mole/liter of dibutylphosphoric acid. Anything else being unchanged, there is obtained a purified gas containing 150 ppm of $SO_2$ and a sulfur production of 38 g/h.

EXAMPLE 4

Example 1 is repeated with the use of a solution containing 0.6 mole/liter of sodium dibutylphosphate, 0.3 m/l of dibutylphosphoric acid and 700 g/l of polyethyleneglycol having an average molecular weight of 200, the remaining portion being water.

Under the same conditions, there is obtained a purified gas containing 100 ppm of $SO_2$ and a sulfur production of 40.5 g/hour.

EXAMPLE 5

Example 1 is repeated with the use of a solution containing 0.5 mole/liter of ammonium benzoate, 0.5 mole/liter of benzoic acid, 750 g/l of hexaethylene glycol methyl ether, the remaining portion being water. The rate of circulation of the solution is 5 liters per hour and the temperature is 80°C.

The purified gas contains no more than 100 ppm of $SO_2$ and the sulfur production amounts to 41.2 g/h.

EXAMPLE 6

Example 1 is repeated except that the solution contains 0.2 mole/liter of potassium nicotinate, 0.2 mole/liter of nicotinic acid and 850 g/liter of tetramethylenesulfone, the remaining portion being water. We have thus obtained a purified gas containing no more than 130 ppm of $SO_2$ and a sulfur production of 39 g/hour.

EXAMPLE 7

A fume resulting from the incineration of the effluent gas from a Claus unit having the following composition by volume:

| $SO_2$ | $H_2O$ | $O_2$ | $CO_2$ | $N_2$ |
|---|---|---|---|---|
| 1% | 30% | 2% | 5% | 62% | is injected at a rate of 1 m³/h into the bottom of a packed column at the upper portion of which is introduced, at a rate of 5 l/h, a solution consisting essentially of a mixture of polyethyleneglycol having an average molecular weight of 400, water and urea. The solution contains about 500 g/l of polyethyleneglycol 400 and 1 mole/liter of urea, the remaining portion being water. The temperature is maintained at 75°C. The purified gas evolving from the column contains 90 ppm by volume of $SO_2$.

At the lower portion of the column, we recover a liquid phase containing $SO_2$ which is sent to the top of a second column filled with solution and maintained also at a temperature of 75°C. At the lower portion of said second column, we inject, through a wall of fritted glass, hydrogen sulfide at a rate of 20 liters/hour. $H_2S$ is almost completely absorbed. From the bottom of the column, we recover a solution containing sulfur in suspension which, after filtration, is fed back to the first column. The sulfur cake, impregnated with solution, is molten in an autoclave so as to separate pure sulfur from the solution which is fed back to the main circuit. The sulfur production amounts to 40.5 g/h.

EXAMPLE 8

The test of example 7 is repeated on 1 m³/h of a fume issued from a fuel combustion plant and having the following composition by volume:

| $SO_2$ | $H_2O$ | $O_2$ | $CO_2$ | $N_2$ |
|---|---|---|---|---|
| 0.2% | 12% | 2% | 12% | 73.8% |

The solution of example 7 is circulated at a rate of 1.5 liter/h; the two columns are operated at a temperature of 55°C.

The $SO_2$ content of the purified gas is 60 ppm by volume and the sulfur production amounts to 8.3 g/h.

EXAMPLE 9

Example 7 is repeated with the use of an urea solution at a concentration of 1 mole/liter in water. The temperature of the solution is maintained at 70°C in the two stages. Everything else being unchanged, there is observed that the purified gas evolving from the absorption column only contains 130 ppm by volume of $SO_2$. The sulfur production amounts to 38.5 g/h.

EXAMPLE 10

Example 7 is repeated with the use of a solution containing 0.8 mole/liter of thiourea and 600 g/liter of polyethyleneglycol having an average molecular weight of 400, the remaining portion being water. The temperature is maintained at 78°C in the two stages.

Everything else being unchanged, there is observed that the purified gas only contains 110 ppm by volume of $SO_2$. The sulfur production amounts to 40 g/h.

What we claim is:

1. A process for purifying a gas containing sulfurous anhydride and 0.5–10% by volume of oxygen, while producing elemental sulfur, said process comprising: in a first stage contacting the gas at 20°–130°C with an absorbing solution of urea, thiourea or an alkali metal or ammonium salt of benzoic acid or of an alkyl-, cycloalkyl- or aryl-phosphoric acid in a mixture of water and polyethylene glycol having a molecular weight of about 200–600, so as to absorb the sulfurous anhydride in said absorbing solution, separating resultant sulfurous ahnydride containing absorbing solution from the gas containing 0.5–10% by volume of oxygen, and, in a second stage contacting resultant separated solution at 20°–130°C with a gas containing hydrogen sulfide, substantially in the absence of oxygen, so as to produce sulfur and to regenerate the absorbing solution used in the first stage.

2. A process according to claim 1, in which the absorbing solution also containing water.

3. A process according to claim 1, in which the acid used for producing the salt has at least one acid function whose $pK_a$ is from 2.5 to 6.

4. A process according to claim 1, in which the molar ratio of the constituents, base/acid, which participate in the composition of the salt, is from 0.1 to 2.

5. A process according to claim 1, in which the molar ratio of the constituents, base/acid, which participate in the composition of the salt, is from 0.2 to 0.9.

6. A process according to claim 1, in which the solution is an urea solution.

7. A process according to claim 1, wherein each stage of the process is conducted at 40°–90° C.

* * * * *